Oct. 1, 1968   R. F. SAUER   3,403,925

SELF-CENTERING WHEELED AXLE

Filed Dec. 28, 1966   2 Sheets-Sheet 1

INVENTOR.
ROMAN FRANZ SAUER
BY
Edwin E. Greigg
ATTORNEY

Oct. 1, 1968   R. F. SAUER   3,403,925
SELF-CENTERING WHEELED AXLE

Filed Dec. 28, 1966   2 Sheets-Sheet 2

INVENTOR.
ROMAN FRANZ SAUER
BY Edwin C. Greigg
ATTORNEY

United States Patent Office 3,403,925
Patented Oct. 1, 1968

3,403,925
SELF-CENTERING WHEELED AXLE
Roman Franz Sauer, 8752 Keilberg uber
Aschaffenburg, Germany
Filed Dec. 28, 1966, Ser. No. 605,375
Claims priority, application Germany, Dec. 30, 1965,
S 101,258; Jan. 5, 1966, S 101,320
10 Claims. (Cl. 280—81)

ABSTRACT OF THE DISCLOSURE

This invention relates to an oscillatable mobile assembly which includes a wheeled axle for supporting the same and is adapted for attachment to highway-drawn load-carrying vehicles including a chassis adapted to support the load. A support means positioned beneath the chassis includes an upper, substantially horizontally disposed face which directly supports the chassis and the load of the trailer. The lower face of an annular raceway means may be formed as a part of the support means or be a separate element and is complemental to an annular element supported by a frame means, the latter being positioned for springing movement relative to a wheeled axle by shock absorbing means. The raceway means are canted downwardly and due to the pivotal manner in which the upper raceway means is associated with the frame means and a centering device which includes latching means that cooperates with the upper raceway means, the axle of the mobile assembly is normally transverse to the trailer chassis. However, the axle may be caused to be moved to the position shown in FIG. 3 of the drawings when traversing through a curved path.

---

This invention concerns a self-centering axle for a vehicle with at least one fixed single or multiple axle. When negotiating a circle-shaped curve such an axle makes it possible to advance the center of the circle by self-centering. This self-centering is induced by the fixed single or multiple axle achieved by the tire friction on the roadway. As the functioning of such self-centering axles depends on the nature of the tires, the road or ground surface, the weight of the load carried and on other factors, undefinable conditions occur during the centering process, i.e. the axle tends to flutter. This tendency can be eliminated by including a mechanically operated steering process which with a semi-trailer, for instance, is controlled at the saddle coupling. This is effected by means of complicated auxiliary steering devices which include swivel rings in connection with leaf-type springs. Owing to the longer wheel bases, which are the inevitable result, the axle assemblies get extremely heavy. Their safe operation is found wanting, especially when maintenance and lubrication are neglected. Due consideration must also be given to the design of the vehicle chassis as regards the placing of the steering mechanism. When the steering device is part of the saddle coupling, the trailer can only be used with a particular type of semi-trailer tractor.

This invention solves the problem of self-centering in a satisfactory way, i.e. no unstable conditions occur during the operation of the vehicle and no steering device is required to operate the centering action. The return movement, into straight-ahead motion is achieved through co-operation of relatively simple means.

This invention lies in the fact that the center of motion of the mobile assembly is situated in front of the axle. The mobile assembly can include a pivot frame with an upper raceway and a lower raceway comprising complemental flange means or it can be a pivot bearing with pivot pin.

A further characteristic of this invention is that the mobile assembly is slightly inclined towards the roadway. The upper flange or first raceway of the mobile assembly should preferably have its lowest point on the center line of the vehicle. Thus, the load resting on the mobile assembly acts as the force effecting the return movement.

A further return movement force can be created in accordance with this invention by joining the upper and the lower part of the mobile assembly on one hand and the upper and lower complemental flanges on the other hand in their center of motion by means of an elastic coupling. A possible construction involves a square body portion on one flange which is encased by a casing of the other flange and which is firmly connected with this casing by means of a rubber filling. During the centering process the rubber blocks are stretched and expanded and exercise a force causing the return movement when a straight-ahead motion is resumed.

However, this effect is insufficient with minor steering motions and requires therefore an additional return movement and an exact adjustment for straight-ahead driving. In the above example this is achieved by a well-known catch device comprising a part shaped like the backsight of a rifle and a counterpart shaped like the foresight of a rifle. This catch device couples the upper flange and the vehicle frame, respectively, with the lower flange of the mobile assembly, however, giving way elastically in the direction of turning. With the above-mentioned sample construction the catch device has a foresight-shaped part which is inserted in the notch of the backsight-shaped part. The former is actuated by a compressed air cylinder.

According to this invention the compressed air cylinder is actuated by the pressure of the pneumatic shock absorber, the pressure being a function of the load carried by the vehicle. Subsequently the foresight-shaped part is forced into the notch with varying piston force.

The return movement of the mobile assembly is guaranteed under any loading conditions for straight-ahead driving as well as negotiating bends by the above effect which is a function of the load carried by the vehicle. When a vehicle equipped in such a way carries a heavy load, the compressed air cylinder in conjunction with the afore-sight-shaped part exerts a greater return movement force than it would when the vehicle carries no load.

According to this invention the mobile assembly may be used in multiple ways with the chassis of a vehicle with a trailer. It may be used on its own, i.e. without being attached to a fixed axle, as a rear axle. However, in this case there would be a disadvantage involved since special measures would have to be taken to obtain a sufficiently great actuating force for the centering process. It would be better to arrange the mobile assembly in front of or at the back of a fixed axle in the rear part of a vehicle. With this arrangement the mobile assembly would preferably be placed at the back of a fixed axle, i.e. near the rear end of the chassis.

Other objects and advantages will become apparent from the following description taken in conjunction with the accompanying drawings, in which.

Figure 3:
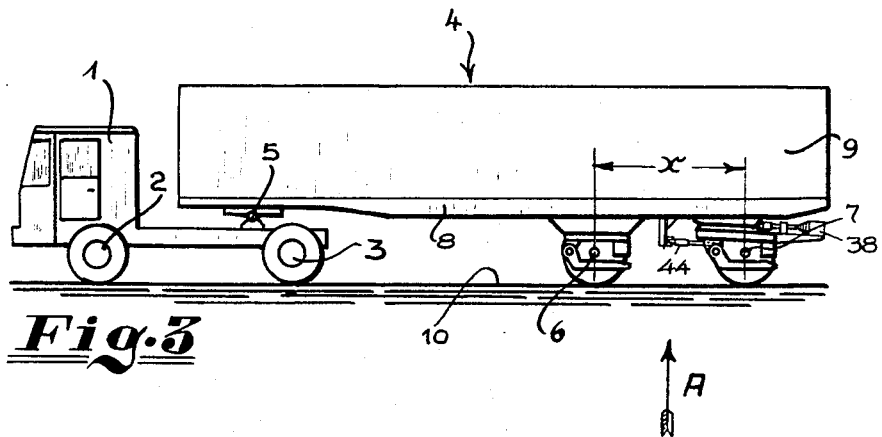
FIG. 3 is a side elevational view of a semi-trailer truck tractor provided with the oscillatable mobile assembly.

The semi-trailer truck tractor 1 includes a pneumatic tired steering axle 2 and a spring-loaded, relatively non-movable axle 3. The semi-trailer 4 and the tractor 1 are associated through the well-known "fifth" wheel or saddle device 5. The semi-trailer 4 comprises dual rear axles, an inwardly positioned fixed axle 6 and the rearwardly disposed oscillatable mobile assembly for attachment to highway-drawn load-carrying vehicles and includes an axle 7. These axles are appropriately secured to the chassis 8 to thereby support the load-carrying body 9. The distance X indicated in FIG. 3 between the center lines of the fixed axle 6 to the axle 7 is approximately two meters or slightly more. Thus, the greater proportion of the weight of the load of the body portion 9 is transmitted onto the roadway 10 in two places which are approximately two meters apart.

Figure 4:
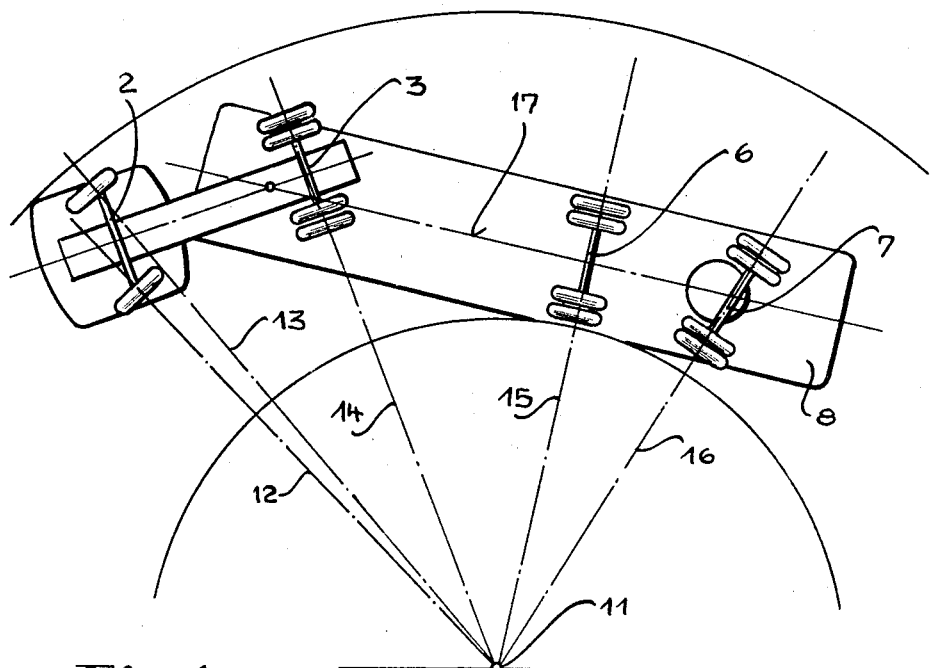
FIG. 4 is a bottom plan view of the semi-trailer truck tractor shown in FIG. 3 with the tractor pulling the body portion through a circular path.

FIG. 4 shows the semi-trailer truck tractor traveling together with its load through an arc of a circle, the center of which is indicated at 11. As graphically shown in this view, an imaginary line extending from the axes of the steered wheels 2, as well as 14 of the non-movable axle 3 of the tractor 1, together with the line 15 projected from the fixed axle 6 and the projected line 16, taken from the axis of the axle 7, all intersect at center point 11.

As shown also in FIG. 4, the center line of the vehicle is indicated as 17. The swiveling axis of the saddle device or "fifth wheel" 5 and the center of motion of the self-centering axle 7 are situated on this line.

Figure 1:
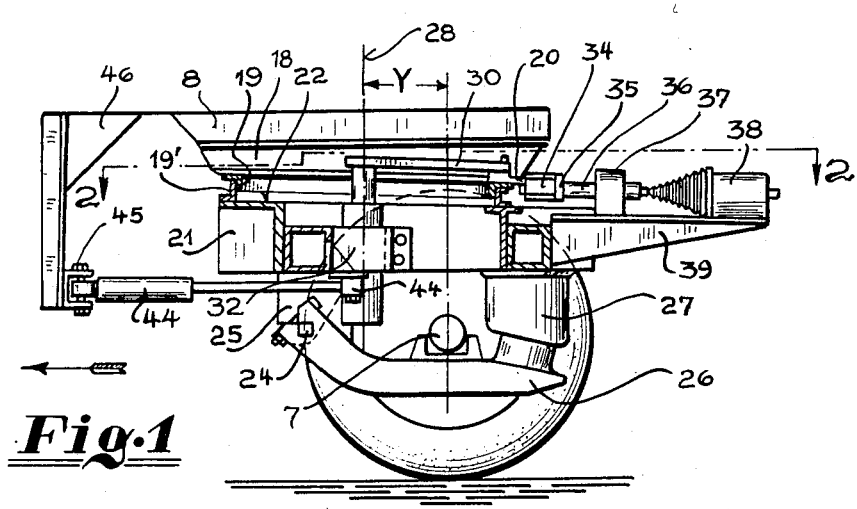
FIG. 1 is a left-hand view of the mobile assembly with the pneumatic tires removed from the left-hand end of the axle.

The oscillatable mobile assembly together with the wheeled axle, as best shown in FIG. 1, includes a support means 18 having an upper substantially horizontally disposed face which is adapted to be secured to the lower surface of the chassis 8. The support means 18 may include as an integral part thereof or have provided as a separate attachable means, a first raceway 19 which is inclined at a slight angle relative to the upper face of the support means 8. The first raceway 19 is supported by a complementally-formed second raceway 19', the lower face of which is also inclined at an angle to the horizontal, and is positioned on a frame means 21 as shown. As will be clear from an examination of FIG. 1, the upper side 22 of the mobile assembly is slightly inclined towards the roadway 10, this inclination pointing backward and down and terminating beyond the axle 7. The wheeled axle 7 is interconnected with the pivotal joint 24 by means of a fixed bracket 25 which is formed as a part of the frame 21, this being effected by two transversely spaced axle brackets 26 on the free end of which the chassis 21 is supported by means of pneumatic shock absorbers 27 (only one shown). Accordingly, in view of the foregoing it will be apparent that pivotal joint 24 is positioned between the fixed brackets 25 and the axle brackets 26. As the wheel axle 7 is removed by the distance Y, as shown by the center lines in FIG. 1, from the approximately inclined center of motion 28 of the oscillatable mobile assembly, the entire body 9 of the tractor trailer is raised by a corresponding distance when the axle 7 centers into the direction of the periphery during circular motion of the vehicle as exemplified more clearly in FIG. 4. The load carried by the tractor trailer is then raised to a higher level, the potential of which tends to return the axle 7 to the initial position. However, this can only be accomplished by the entire vehicle returning from a circular path to a straight-ahead path.

Figure 2:
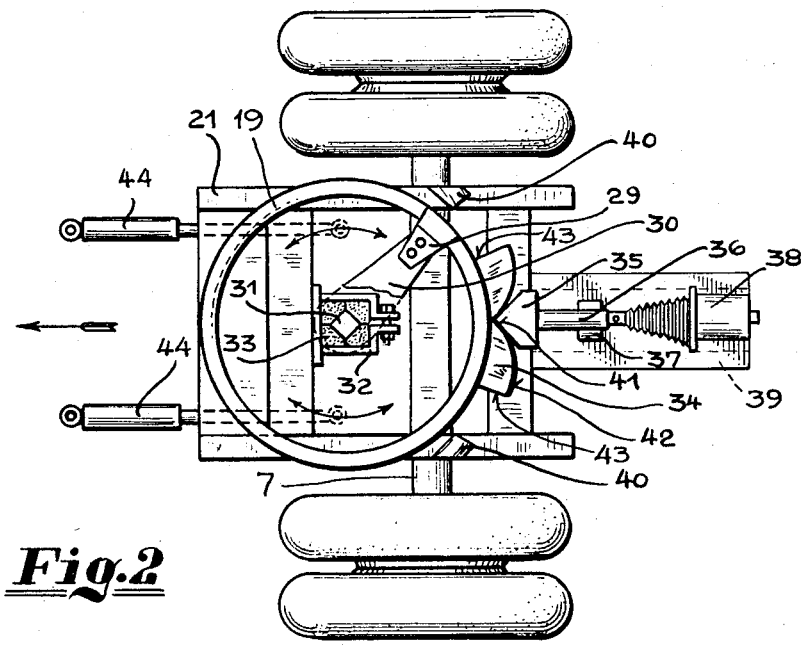
FIG. 2 is a view on line 2—2 of FIG. 1.

Turning now to FIG. 2, it will be observed that the upper raceway 19 is associated through the medium of a clip 29 and the arm 30 to a stub shaft 31 which may be formed as an integral part of arm 30, said stub shaft being provided with a square body portion as clearly shown in the drawing. The frame 21 also includes a square socket or bracket means 32 and segments of a rubber coupling material 33 are adapted to be positioned within the socket 32 and engage the stub shaft 31 for a purpose that will become apparent as the description progresses. It will be immediately seen that the upper raceway 19 is thus elastically coupled with the frame 21 through the members previously described. As shown best in the general top plan view of the mobile structure exhibited by FIG. 2, the edges of the stub shaft 31 and the corners of the square socket 32 are arranged at an angle of 45° which thereby creates between them a space to receive the rubber coupling 33. In this instance the rubber coupling comprises four blocks or segments, the cross-sections of each of which is substantially triangular. However, the coupling can also be effected, for instance, by vulcanizing the rubber material to the stub shaft 31. It is also believed that as the description progresses and the invention is better understood, it will be observed how the rubber coupling tends to return the first raceway 19 and its load carrying body 9 to a straight-ahead direction.

Also from an examination of FIG. 2 it will be observed that the first raceway 19 includes a notched member 34, the opposite extremities of each leg of which are curved outwardly as at 42 in diametrically opposite directions and abruptly terminate in end walls 43—43 which intersect the annular perimeter of the first raceway, all of which is clearly shown in the drawing. The outwardly curved or arcuate surfaces of element 34 are adapted to cooperate with a power operated centering means carried by a frame extension 39 which is longitudinally aligned with the chassis 8 and the frame 21. A pair of bumpers 40—40 are mounted relative to the frame 21 and are adapted to prevent excessive movement of the first raceway 19, said bumpers 40 being adapted to be contacted by the end walls 43 of element 34. The centering means positioned on the frame extension 39 includes a forwardly extending V-shaped body 35 somewhat resembling an arrow and is arranged to extend longitudinally of the frame 21 and its converging edges are adapted to be received in the notch 41 provided between the outwardly curved walls 42 of the device carried by the first raceway 19. Accordingly, in view of the foregoing it is believed that it will be apparent to those skilled in the art that, in lieu of the complemental raceway means shown in the drawings of this application, any paired means capable of providing rotatable support between the chassis 8 and frame 21 (including ball bearing raceways) may be utilized.

By making reference once again to FIG. 1 and the shock absorbing means shown therein indicated at 27, it is desired to point out that the compressed air cylinder 38 is actuated by the pressure of the pneumatic shock absorbing devices 27 carried adjacent to the brackets 26. Furthermore, it is to be understood that the pressure of the compressed air cylinder 38 is a function of the axle pressure and is directly proportional to the latter. This arrangement of elements and the cooperation between the V-shaped head 35 and the notch 41 of the outwardly curved or arcuate surfaces of the first raceway 19 prevent the axle 7 from moving due to minor forces. Referring again at this time to FIG. 4, it will be understood that when the front wheels carried by the axles 2 and 3 of the tractor 1 describe a short turning radius, the arrow head shaped portion 35, together with its longitudinally extending shank portion 36 is moved longitudinally rearwardly toward the air cylinder 38 and thus rides up either one or the other of the outwardly curved surfaces 42 and will rest there until the vehicle once again assumes a straight-ahead traveling direction. Simultaneously with the vehicle returning to a straight-ahead traveling direction, the arrow-shaped body portion 35 moves longitudinally away from the compressed air cylinder 38 and back down one or the other of the inclined surfaces 42 until it once again comes to rest at point 41 in the intersecting faces thereof.

Thus, it is to be observed from the aforementioned description that the force of the return movement devices comprising the stub shaft 31 together with its surrounding rubber triangularly shaped bodies and the bracket in which they are pivotally positioned and the return movement element comprising the compressed air cylinder together with its appurtenances which are adapted to cooperate with the curved surfaces of the notched elements secured to the first raceway 19 are added to an almost constant value. Thus, to express this in a more simplified manner, the return movement devices identified as 31, 32 and 33 reach their greatest force when the return movement devices identified as 34, 35, 36 and 38 exert their weakest force, and vice versa.

As the forces effecting movement and return movement are functions of the weight of the load carried by the vehicle, the compressed air cylinder 38 is actuated by the pneumatic shock absorbers 27. This cylinder therefore exerts its greatest force when the weight of the load carried has reached a maximum value.

During dead-freight operation, on the other hand, the return movement cylinder 38 offers only slight resistance to the centering force of the axle 7 when the wheels leave track.

When traveling on uneven surfaces, kerbs and bad roads, the self-centering axle 7 tend to leave track as soon as one of the wheels is forced to negotiate an obstacle. According to this invention, this phenomenon is eliminated by the inclusion of bilaterally effective hydraulic steering dampeners or shock absorbers 44—44.

An abrupt shock exerted on one wheel causes the steering dampeners to counteract with their pre-set force and the axle 7 is thus prevented from leaving track. The operational mode of the steering dampeners is like that of shock absorbers. Abrupt shocks are absorbed, and the prolonged effects of forces as occur when curves are negotiated cause a turning of the flange, an action which is not counteracted by the steering dampeners.

The two steering dampeners are mounted at 44—44 on the chassis 46 as at 45 and on the mobile frame 21 at 44. One of these dampeners is subjected to compression and the other one to pull when road curves are negotiated. Bilaterally effective steering dampeners are installed at extended pull in the central travel position of the steering dampeners.

The steering dampeners are accurately synchronized with the return movement forces of the elastic coupling and the pneumatic stop device.

What is claimed is:

1. An oscillatable mobile assembly including a wheeled axle for attachment to highway-drawn load-carrying vehicles including a chassis comprising, support means having an upper, substantially horizontally disposed face adapted to be secured to the lower surface of said chassis, first raceway means carried by the support means, a complementally-formed second raceway means arranged to rotatably support said first raceway means, frame means adapted to support said first and second raceway means and therethrough said support means, pivotally mounted means carried by said frame associated with said first raceway means, steering dampening means interconnecting the frame means with the chassis, transversely spaced swingable means affixed to the frame adapted to cooperate with shock-absorbing means, and said swingable means also adapted to support the wheeled axle.

2. An oscillatable mobile assembly as claimed in claim 1, wherein said support means includes a lower surface inclined at a slight angle relative to the upper face.

3. An oscillatable mobile assembly as claimed in claim 1, wherein the inclination of the first and second raceway means is toward the wheeled axle.

4. An oscillatable mobile assembly as claimed in claim 1, wherein the pivotally mounted means carried by said frame which is associated with said first raceway means includes an elastic coupling.

5. An oscillatable mobile assembly as claimed in claim 1, wherein the first raceway means includes means adapted to be associated with a power operated centering means adapted to orient the wheeled axle transversely of the chassis during straight-away highway travel of said assembly.

6. An oscillatable mobile assembly as claimed in claim 5, wherein the centering means associated with the first raceway means includes a notch, the opposite extremities of each leg of which are curved outwardly in diametrically opposite directions and abruptly terminate in end walls which intersect the first raceway means.

7. An oscillatable mobile assembly as claimed in claim 6, wherein the end walls of said notch are adapted to cooperate with diametrically disposed buffer means carried by said frame.

8. An oscillatable mobile assembly as claimed in claim 5, wherein the shock-absorbing means is arranged to feed a pressurized medium to the centering means and thereby adapted to orient the wheeled axle transversely of the chassis during straight-away highway traveling of said assembly.

9. An oscillatable mobile assembly as claimed in claim 1, wherein said pivotally mounted means carried by said frame and associated with said first raceway means includes an upstanding stub member which extends normal to the frame.

10. An oscillatable mobile assembly as claimed in claim 1, wherein the steering dampening means comprises shock absorbers.

References Cited

UNITED STATES PATENTS

| | | | |
|---|---|---|---|
| 2,269,728 | 1/1942 | Mills | 280—81 |
| 2,502,946 | 4/1950 | Hart | 280—104.5 |
| 2,672,350 | 3/1954 | Ott | 280—81 |
| 2,731,276 | 1/1956 | Cross. | |
| 2,848,244 | 8/1958 | Georgi | 280—81 |
| 3,284,094 | 11/1966 | Grace | 280—81 |

FOREIGN PATENTS 289,491   3/1965   Netherlands.

KENNETH H. BETTS, *Primary Examiner.*